(No Model.)

L. F. WHITMAN.
SEAT ATTACHMENT FOR BICYCLES.

No. 416,699. Patented Dec. 3, 1889.

Witnesses:
J. A. Garfield.
G. M. Chamberlain.

Inventor
Louis F. Whitman
by Chappewith
Attorneys

United States Patent Office.

LOUIS F. WHITMAN, OF SPRINGFIELD, MASSACHUSETTS, ASSIGNOR OF ONE-HALF TO THE WARWICK CYCLE MANUFACTURING COMPANY, OF SAME PLACE.

SEAT ATTACHMENT FOR BICYCLES.

SPECIFICATION forming part of Letters Patent No. 416,699, dated December 3, 1889.

Application filed September 2, 1889. Serial No. 322,761. (No model.)

*To all whom it may concern:*

Be it known that I, LOUIS F. WHITMAN, a citizen of the United States, residing at Springfield, in the county of Hampden and State of Massachusetts, have invented new and useful Improvements in Bicycle Attachments, of which the following is a specification.

This invention relates to bicycles and similar vehicles whose construction embodies a steering-wheel supported in a bifurcated steering-post; and it particularly relates to an improved attachment, which is connected to said steering-post or members thereof, which constitutes a seat for another person than the one who rides and propels the vehicle.

Figure 1:
Figure 2:
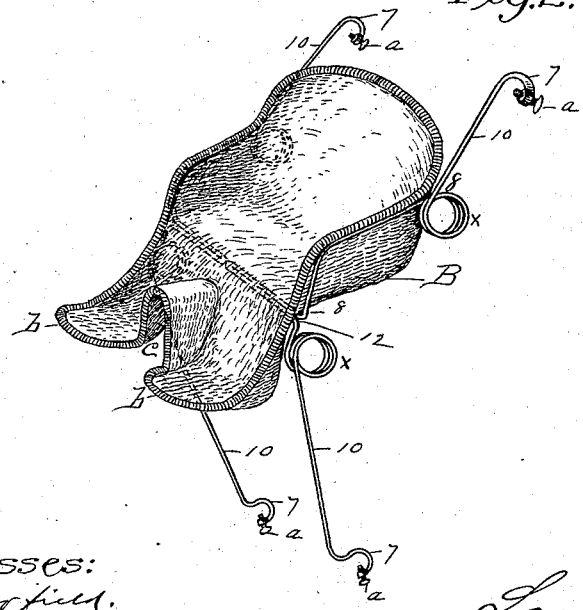

In the drawings forming part of this specification, Figure 1 is a perspective view of a bicycle having a seat attachment applied thereto according to my invention, said bicycle being shown with two persons mounted thereon. Fig. 2 is a perspective view of the said seat attachment separate from the bicycle.

The seat proper B of the bicycle attachment herein described is constructed, preferably, of woven willow or rattan, as indicated in the drawings; but any other suitable construction may be employed, said seat B being provided with suitable foot-rests $b$ at the lower end of the seat and having between said foot-rests a covered or partially-inclosed wheel-passage $c$, for the protection of the clothing of the person riding in said seat from the wheel over which it is placed.

The seat B, above referred to, is supported on any suitable metallic frame or bars, which are attached to or supported from or by the steering-post 4 of the bicycle or its connected parts or extensions—as, for instance, the handle-bar 3 and the steering-post fork-arms 5. In this instance the seat-supporting frame consists of two metallic rods 8, each having an extended arm 10 at its upper and lower ends, which terminates in a hooked-shaped formation 7, or other suitable form for proper engagement and connection with the handle-bar 3 at its upper end and the foot-rest 6 on the fork-arm 5 of the steering-post at its lower end, a thumb-screw $a$ or other suitable similar fastening being provided at the extremity of each of said arms 7, if desired, whereby the ends of said arms may be so engaged with the parts above mentioned that they will not become easily detached. When a seat B of the description shown in the drawings is employed with the seat-supporting rods 8, portions of the latter are bent inward, or to extend under the seat more or less, to aid in supporting the same, as at 12, Fig. 2, and, if desired, spring-coils $x$ may be formed intermediately between the ends of said rods 8. The seat B is securely attached by each side in any suitable manner to the said seat-supporting rods. The said foot-rests 6 on the fork-arms of the steering-post being an ordinary element of construction of bicycles are utilized for attaching the lower ends of the seat-supporting rods to the steering-post as the most economical manner of effecting such attachment; but it is obvious that other suitable means therefor may be employed.

The attachment of the upper ends of the seat-supporting rods 8 to the handle-bar 3 of the bicycle constitutes, essentially, an attachment of the upper ends of said rods to the upper end of the steering-post itself, since said handle-bar is, as is well known, rigidly bolted to the upper end of said steering-post.

The within-described improved seat attachment for bicycles is preferably made so that it may be applied to and removed from the vehicle at pleasure, to the end that if only one person is desirous of riding thereupon the machine may not be cumbered with the attachment; but it is obvious that if desired the seat attachment may be a permanent fixture on the vehicle.

What I claim as my invention is—

1. The combination, with the front fork and head of a bicycle provided with horizontally-extended projections at different heights thereon, of a seat provided at each side with upwardly-extending rods, and also with downwardly-extending rods adapted to be engaged with said horizontal projections of the fork and head for the support of said seat, substantially as set forth.

2. A seat for bicycles, provided at each side with upwardly and also downwardly extended rods comprising coiled springs intermediately thereof and adapted for an attachment with the horizontal handle-bars of the bicycle, and also with the legs of the front fork below the top of the forward wheel, substantially as and for the purpose described.

3. The combination, with the bicycle, of a seat having the downward leg and foot-rest extension formed with the central hooded wheel-passage $c$, and the upwardly and downwardly extending side rods connecting with said seat and with the horizontal handle-bar and the fork-legs below the top of the wheel, substantially as and for the purpose set forth.

LOUIS F. WHITMAN.

Witnesses:
H. A. CHAPIN,
G. M. CHAMBERLAIN.